United States Patent [19]

Fujita

[11] 4,188,296
[45] Feb. 12, 1980

[54] FUEL COMBUSTION AND MAGNETIZING APPARATUS USED THEREFOR

[76] Inventor: Etuo Fujita, No. 2-15-17, Jiyugaoka, Meguro-ku, Tokyo, Japan, 152

[21] Appl. No.: 868,291

[22] Filed: Jan. 10, 1978

[30] Foreign Application Priority Data

Jan. 10, 1977 [JP] Japan .................................. 52/774

[51] Int. Cl.² ......................... B01D 35/06; F23D 0/0
[52] U.S. Cl. .................................. 210/222; 210/425; 123/119 E; 431/356
[58] Field of Search ............... 431/356, 3, 121; 239/3; 123/119 E; 210/222, 425; 335/219, 210

[56] References Cited

U.S. PATENT DOCUMENTS

| | | | |
|---|---|---|---|
| 2,087,399 | 7/1937 | Elfving et al. | 431/90 |
| 2,926,276 | 2/1960 | Moriya et al. | 123/119 E |
| 3,059,910 | 10/1962 | Moriya | 123/119 E |
| 3,228,878 | 1/1966 | Moody | 210/222 X |
| 3,349,354 | 10/1967 | Miyata | 123/119 E |
| 3,402,820 | 9/1968 | Lohmann | 210/222 |
| 3,567,026 | 3/1971 | Kolm | 210/222 |
| 3,719,583 | 3/1973 | Ustick | 210/222 X |
| 3,830,621 | 8/1974 | Miller | 123/119 E X |
| 3,923,660 | 12/1975 | Kottmeier | 210/222 |
| 3,951,807 | 4/1976 | Sanderson | 210/222 |
| 3,952,716 | 4/1976 | McCauley | 123/119 E X |
| 3,973,899 | 8/1976 | Reed et al. | 431/202 |
| 4,050,426 | 9/1977 | Sanderson | 431/356 X |

FOREIGN PATENT DOCUMENTS

| | | | |
|---|---|---|---|
| 2256379 | 5/1974 | Fed. Rep. of Germany | 123/119 E |
| 2459324 | 7/1975 | Fed. Rep. of Germany | 431/202 |
| 342411 | 12/1959 | Switzerland | 123/119 E |
| 765495 | 1/1957 | United Kingdom | 210/222 |
| 814269 | 6/1959 | United Kingdom | 123/119 E |

*Primary Examiner*—Samuel Scott
*Assistant Examiner*—Randall L. Green
*Attorney, Agent, or Firm*—Armstrong, Nikaido, Marmelstein & Kubovcik

[57] ABSTRACT

The combustion of fluid fuel, typically fuel oil in burners or boilers is improved by applying a magnetic field to the fuel at the point upstream of the burner to impart a magnetic flux density of at least 10 gauss to the fuel, and adjusting the magnetic field to reduce to a minimum the dust and residual oxygen contents in an exhaust gas. A magnetizing apparatus is also disclosed which comprises permanent magnets and movable yokes for adjusting a magnetic flux density traversing a pipe for feeding fuel. The magnetizing apparatus is located on the pipe between pumping means and the burner.

3 Claims, 11 Drawing Figures

FUEL COMBUSTION AND MAGNETIZING APPARATUS USED THEREFOR

BACKGROUND OF THE INVENTION

This invention relates to an improvement in fluid fuel combustion, more particularly to a method of effectively burning fluid fuel by applying a magnetic field to the fuel and optionally to steam or air to be fed to combustion devices.

With the increased attention to pollution problems and resource saving problems, it has become important to reduce the dust, residual oxygen and nitrogen oxide contents in exhaust gases from burners and boilers.

SUMMARY OF THE INVENTION

The inventor has found that the combustion of fluid fuel, for example, fuel oil in burners can be effectively improved by applying a magnetic field to the fuel to be fed to burners.

A primary object of this invention is to improve the combustion of fluid fuel in combustion devices, for example, fuel oil in boilers.

Another object of this invention is to provide a method of effectively performing the combustion of fluid fuel so that boilers can be operated with a lower content of residual oxygen in exhaust gas.

Still another object of this invention is to reduce the dust loading in exhaust gas from combustion devices.

A further object of this invention is to provide a magnetizing apparatus of a simple construction for applying a magnetic field to fuel to be fed to combustion devices to ensure more complete combustion.

The above and other objects of the invention will appear more fully from the following description.

According to this invention, there is provided a method of effectively performing the combustion of fluid fuel comprising the steps of feeding fluid fuel and oxygen-containing gas to a combustion device, applying a magnetic field having a magnetic flux density of at least 10 gauss to the fuel at a point upstream of said combustion device, and adjusting the flux density to reduce the dust and residual oxygen contents in exhaust gas to a minimum.

The magnetic flux density to be imparted to fuel widely varies depending upon fuel, air or steam, and combustion equipment and conditions. In general, the preferred range of magnetic flux density is from 1000 to 3500 gauss, and the most preferred range is from 1400 to 1800 gauss when fuel oil is used in combination with conventional heat power boilers. However, these preferred ranges are merely illustrative since preferred ranges will shift to lower or higher value if one or more of the above-described factors are changed. The optimum range will be determined through experimental runs.

In the preferred embodiment of this invention, a magnetic flux density of at least 500 gauss may additionally be imparted to air which is supplied to burners together with fuel. A magnetic flux density of 500 to 2000 gauss may be imparted when steam is used.

This invention also provides a magnetizing apparatus in combination with pipes for feeding fluid fuel and air-containing gas to combustion devices, which comprises a casing which has suitable means for securing the casing on the pipe so that the pipe penetrates the casing substantially at the center thereof, a pair of connecting yokes fixedly disposed in the casing at the top and bottom thereof, a plurality of permanent magnets placed in two rows between the connecting yokes, a pair of movable yokes sandwiched between the magnets in each row and facing the pipe, and adjusting means for moving the movable yokes toward and away from the pipe, wherein a variable flux density of at least 10 gauss traversing the pipe is produced by the arrangement of the magnets and yokes.

Electromagnet assemblies are also included in this invention.

The method and the magnetizing apparatus of this invention can be applied to any desired combustion system comprising a fuel tank, a pump, a combustion device, for example, a burner, and a pipe for connecting them in fluid communication. The magnetizing apparatus should be located between the pump and the burner because it is unnecessary for any other parts to be magnetized.

The fluid fuel which may be used in this invention includes liquid and gaseous fuel, for example, fuel oil such as Diesel, bunker and burner fuel oils and those known as "A", "B" or "C" fuel oil classified according to the Japanese Industrial Standard; light fuel oil; burning kerosene and light oil; fuel gas or the like.

The combustion devices used herein include general burners and boilers covering from home appliance boilers to heat power boilers, various combustion furnaces, and internal combustion engines, for example, Diesel and gasoline engines for automobile and ships. Any burner or nozzle may be equipped, for example, pressure spraying, air or steam spraying, or rotary type.

According to this invention, the magnitude of magnetic field to be applied to the fuel is adjusted to reduce the dust loading in the exhaust gas to a minimum level. At the optimum range of magnetic flux density, an oxygen supply can be throttled so that the content of residual or non-consumed oxygen in the exhaust gas may be minimized. Operating boilers at a lower residual oxygen content in exhaust gas is advantageous in cost and pollution control since dust is also reduced through the magnetizing treatment of fuel.

The principle of magnetization of fuel does not form a part of this invention, but will be explained as follows. Fuel carriers magnetism. This is confirmed by the fact that a burner made of magnetizable material and located downstream of the magnetizing apparatus is magnetized. Fuel mainly consists of hydrocarbons. Groupings of hydrocarbons, when flowing through a magnetic field or between opposite magnetic poles, change their orientation of magnetization in a direction opposite to that of the magnetic field. The molecules of hydrocarbons shift from a certain configuration to another. At the same time, intermolecular force (van der Waals force) is considerably reduced or depressed. These mechanisms are believed to help to disperse oil particles and to become finely divided. In addition, hydrogen ions in fuel and oxygen ions in air or steam are magnetized to form magnetic domains which are believed to assist in atomizing fuel into finer particles.

Dust in exhaust gas from a boiler was measured by both weight and concentration methods. It was found that at the same weight of dust contained in exhaust gas, the exhaust gas generated after the magnetizing treatment according to this invention exhibited a higher value in concentration than that generated without magnetization. This fact means that dust particles after magnetization are finer than those usually found, which in turn, means that oil particles are made finer by the magnetizing treatment of this invention.

This invention may be applied to compact boilers as well as large-scale boilers exemplified by heat power boilers. Generally, compact boilers suffer from shortcomings that a comparatively large proportion of fuel fed is not consumed, flame is red, spark is generated and vibrating combustion occurs. Combustion conditions are improved by applying magnetism to fuel according to this invention. (1) The flame becomes brighter and turns from red to white orange. A high temperature bright flame is observed. (2) The flame is reduced in vertical length and extended laterally. The rate of combustion becomes higher. (3) Spark in the flame is reduced or eliminated. (4) Vibrating combustion is prevented. (5) Pollution material content in exhaust gas is reduced.

The combustion mechanisms due to the magnetization of fuel according to this invention will be summarized as follows:

(1) After passing a magnetic field, fuel carrying magnetism is atomized from nozzles.

(2) Groupings of hydrocarbons are made repulsive under an influence of a high magnetic field and thus dispersed effectively, resulting in more finely divided fuel particles.

(3) Hydrocarbons are pyrolyzed to generate atomic carbon and hydrogen which combine with oxygen atoms supplied from air or steam to provide explosion reaction, resulting in a high temperature bright flame. A non-combusted carbon value, otherwise appearing as soot, is diminished to a considerable extent.

(4) Fineness of atomized fuel particles accelerates the oxidation rate so that combustion may be carried out at a lower oxygen concentration.

(5) The degree of dilution of the fuel stream by low temperature air is thus reduced, resulting in an increase in flame temperature.

(6) Combustion reaction with atomic carbon prevails. As a result, $CO_2$ is increased in quantity, formation of CO is prevented, and dust is reduced in quantity.

(7) An increase in flame temperature causes a slight increase of nitrogen oxide formation (which can be compensated by other known methods).

(8) A reduction in oxygen concentration and an increase in radiation heat due to high temperature bright flame result in an increase of combustion efficiency.

DESCRIPTION OF THE PREFERRED EMBODIMENTS

Other features and advantages of the invention will be apparent from the following description taken in connection with the accompanying drawings, wherein:

FIG. 4b is an enlarged diagram of FIG. 4a;

Figure 1:
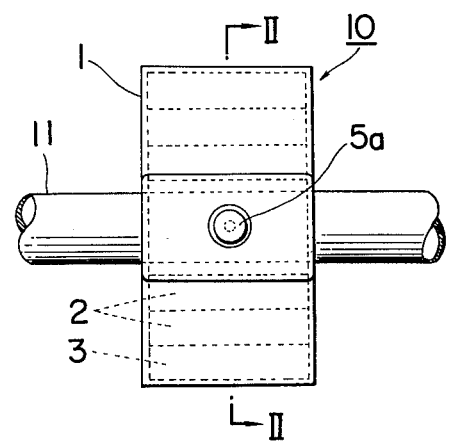
FIG. 1 is a side view showing one example of a magnetizing apparatus mounted on a fuel pipe according to this invention.
Figure 2:
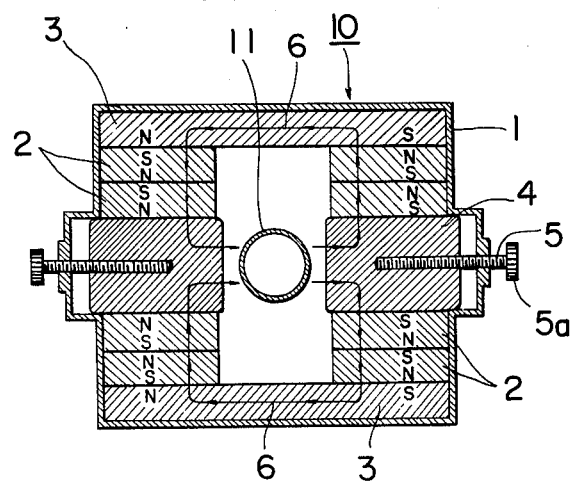
FIG. 2 is a transverse cross section of the magnetizing apparatus taken on line II—II of FIG. 1.

Referring to FIGS. 1 and 2, a magnetizing apparatus of this invention generally designated by numeral 10 comprises a rectangular casing 1. Numeral 11 designates a pipe for feeding fuel to a burner (15 in FIG. 3 as described later). The casing 1 has suitable openings and fixtures (not shown) for mounting and centering the casing 1 on the pipe 11. The casing 1 accommodates a plurality of permanent magnets 2 for example ferrite magnet, arrayed in two rows with one on top of the other in each row, and connecting yokes 3 are fixedly placed at the top and bottom of the casing 1. Two movable yokes 4 are located on opposite sides of the interior of the casing 1 so as to sandwich the pipe 11. The movable yoke 4 is slidable relative to the adjoining magnets 2. The arrangements of magnets 2, connecting yokes 3 and movable yokes 4 at the right and left sides in FIG. 2 are substantially symmetrical with respect to the fuel pipe 11 located at the center of the casing 1. A screw 5 penetrates the side wall of the casing 1 and is threaded in a bore in the yoke 4 so that the yoke 4 may be moved toward and away from the pipe 11 by turning a knob 5a of the screw 5.

More particularly, the magnets 2 each having N and S poles at opposite main sides are arranged alternately in each unit as shown in FIG. 2. Such an arrangement of magnets produces a magnetic field represented by magnetic lines of force 6. With orientation of magnetic poles as shown, the magnetic force flows along loops connecting the right-hand magnets 2, connecting yoke 3, left-hand magnets 2, left-hand movable yoke 4, fuel pipe 11, and right-hand movable yoke 4 in a direction shown by the arrows. In other words, the magnets 2 and connecting yokes 3 provide the same repulsive poles in the proximity of the pipe 11 on each side thereof. The screws 5 and hence the movable yokes 4 serve to adjust the magnetic field applied to the pipe 11 from the magnets 2. Therefore, a variable magnetic flux traversing the pipe 11 is produced by the arrangement of magnets and yokes.

With the above arrangement, a compact magnetizing apparatus is provided which can effectively apply magnetic field to the pipe 11 and hence to the fuel. In addition, the magnetic field can readily be adjusted by turning the knobs 5a to move the yokes 4 toward and away from the pipe 11. The knobs 5a can easily be calibrated through simple experimental measurements to show the magnitude of any magnetic field produced.

Figure 3:
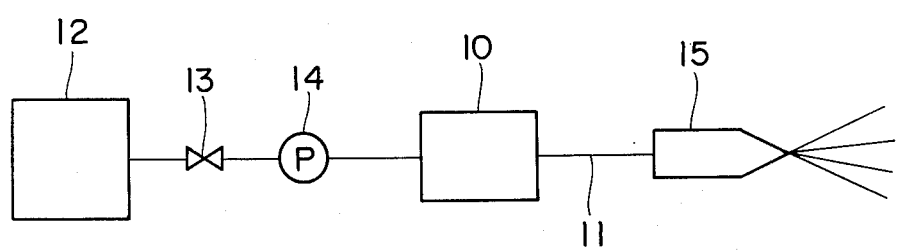
FIG. 3 is a block diagram of a fuel combustion system of this invention.

The magnetizing apparatus of this invention can be applied to a conventional fuel feeding system depicted in FIG. 3. The fuel feeding system comprises a tank 12 from which fuel is fed via a valve 13 and a pump 14 to a burner 15. Between the pump 14 and the burner 15 is located a magnetizing apparatus 10 like that shown in FIG. 1 and 2. The fuel pumped from the tank flows through the magnetic field generated by the magnetizing apparatus 10 and then to the burner 15 through the pipe 11. Typically, the magnetizing apparatus 10 is adapted to impart to fuel a magnetic energy as high as 1000 gauss or more in flux density.

At the initial state of operation of the magnetizing apparatus, most of the magnetism imparted is absorbed or consumed by the pipe 11 if a pipe is made of magnetisable material. This absorption continues until the pipe 11 is magnetized to saturation. The magnetization of pipes is confirmed by the fact that it takes 72 hours or more until dust reduction comes into effect after the magnetizing apparatus is actuated, and that the pipes have residual magnetism after the magnetizing effect or apparatus is removed. The magnetization of associated parts also constitutes a reason why the magnetizing apparatus of this invention should be located downstream of pumps, valves or the like.

When it is desired to avoid such a delay, pipes made of non-magnetic material such as non-magnetic steel (e.g. SUS 316) may preferably be used. A portion of the fuel feeding system extending from a point downstream of the magnetizing apparatus to the burner may be made of non-magnetic material. In this case, magnetized fuel is directly fed to burners or atomizing nozzles with a minimum reduction of magnetism.

Although the magnetizing apparatus is combined with the pipe for feeding fuel in the above-illustrated embodiment, it may also be combined with pipes for feeding air and steam for assisting the combustion of fuel. Such applications are similar to that shown in FIG. 3 and may easily be designed by those skilled in the art.

The following examples illustrate certain applications according to the invention. These are merely illustrative and are not to be construed to limit the claims in any manner whatsoever.

EXAMPLE 1

A fuel feeding system as shown in FIG. 3 was employed. The magnetizing apparatus of this invention was set on a pipe for feeding fuel to a medium-type combustion furnace equipped with six burners. Fuel oil classified as "C" fuel oil according to JIS K 2205 and having sulfur and nitrogen contents of 2.7% and 0.3%, respectively, was fed at a flow rate of 8.9 tons/hour. Magnetic flux density was varied from 0 to 5000 gauss at internals of 100 gauss. The dust content in exhaust gas from the furnace was measured according to JIS Z 8808.

Figure 4A:
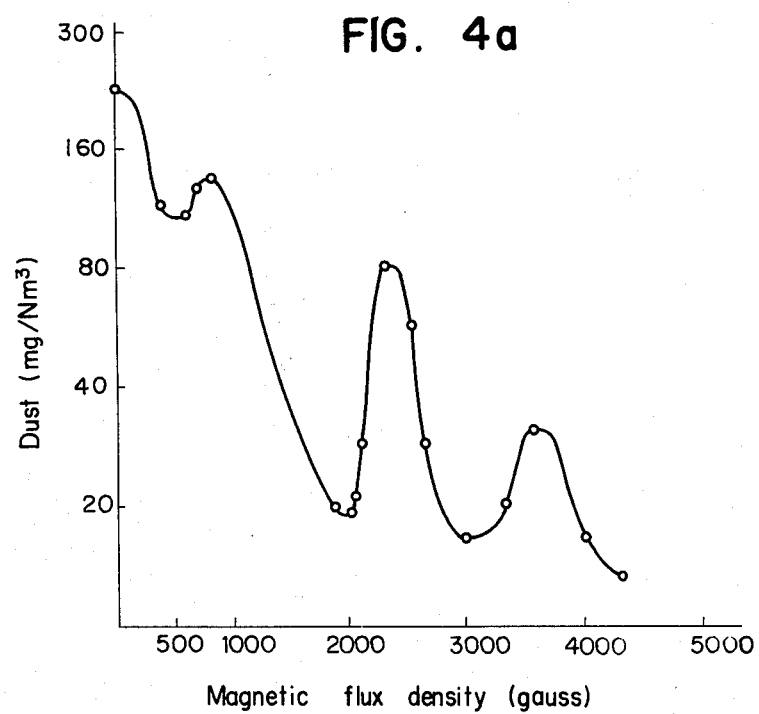
FIG. 4a is a diagram showing the relationship of magnetic flux density to dust loading in Example 1.

The results are shown in FIG. 4a, in which the dust content expressed in terms of mg per Nm$^3$ (normal cubic meters) is plotted as ordinate and the flux density in gauss is plotted as abscissa. As seen from FIG. 4a, a reduction of dust content appears in the range of about 500 to 600 gauss. The dust content is reduced to a minimum in the ranges of 2000±200 gauss, 3000±200 gauss, and about 4400 gauss.

It should be noted that such optimum flux density ensuring a significant dust content reduction in exhaust gas varies depending on fuel, air or steam and combustion equipment.

Figure 4B:
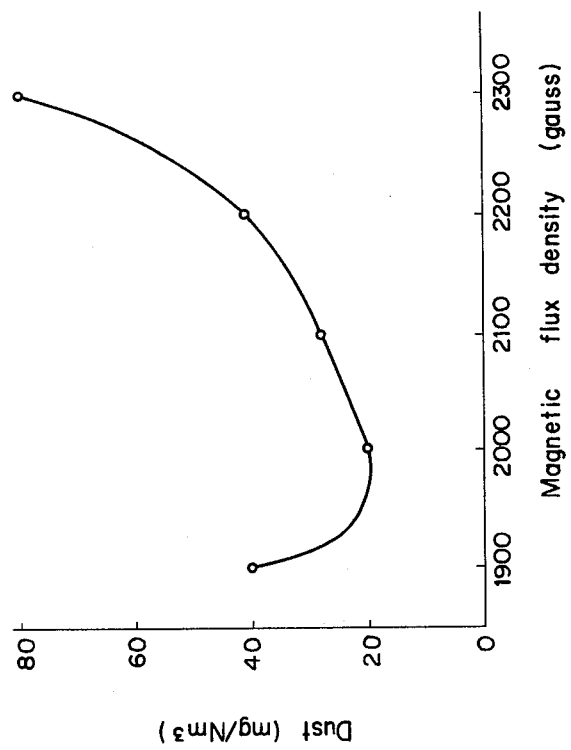

The relationship of dust content to flux density in the proximity of 2000 gauss is shown in FIG. 4b on an enlarged scale. The dust content is reduced to a minimum at a flux density of 2000 gauss and gradually increases as the flux density deviates from the optimum value. The magnetizing apparatus of this invention permits adjustment of the flux density to the optimum range, for example, of 2000±100 gauss simply by turning the knobs to move the slide yokes in relation to the pipe through which fuel flows.

EXAMPLE 2

A general heat power boiler having a steam capacity of 130 tons/hour was used. In this example, not only fuel fed to the boiler, but also steam for assisting combustion were subjected to magnetizing treatment. Operating conditions were as follows.

Fuel oil: "C" fuel oil
Fuel pipe: Magnetization to a flux density of 2000 gauss
Steam pipe: Magnetization to a flux density varying from 0 to 2000 gauss
Period: 10 days The content of residual oxygen in exhaust gas from the boiler was adjusted to 2.0%, 1.2%, or 1.0% by volume in each test run. The dust loading in exhaust gas was measured according to ASTM D2156-65 "Standard Test Method for Smoke Density in Flue Gases from Burning Distillate Fuels." A smoke tester from Bacharach Industrial Instrument Co. was used and the dust loading was expressed in terms of Smoke Tester Number.

Figure 5:
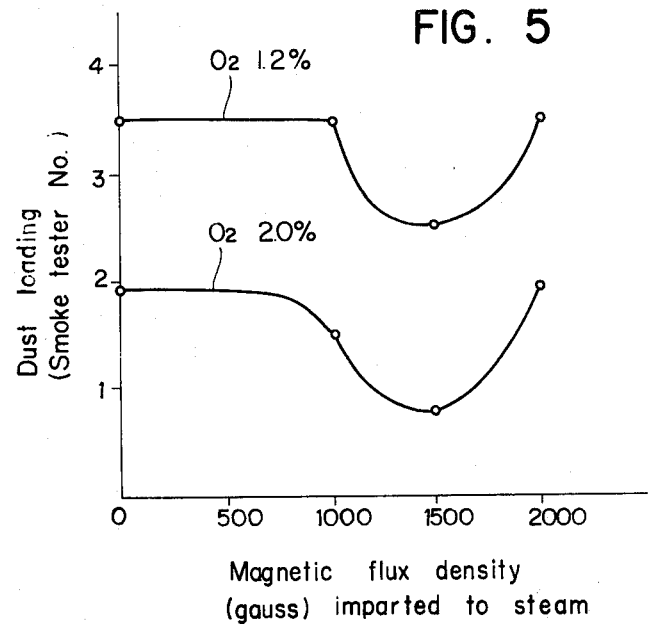
FIG. 5 is a diagram showing the relationship of dust loading to magnetic flux density imparted to steam in Example 2.

The results obtained by varying the flux density from 0 to 2000 gauss in the steam feeding pipe are shown in FIG. 5. As seen from FIG. 5, dust loading is reduced to a minimum when the flux density in steam is in the range between 1400 and 1800 gauss.

At a flux density of 1500 gauss in steam, the dust loading in exhaust gas was measured according to JIS Z 8808 and the content of nitrogen oxides (NO$_x$) was also determined. The results are tabulated in Table I.

Table I

|  | O$_2$ (vol %) | NO$_x$ (ppm) | Dust loading | |
|---|---|---|---|---|
|  |  |  | Smoke tester (NO.) | JIS Z 8808 (mg/Nm$^3$) |
| Magnetized fuel | 2.0 | 155 | 2.0 | 40 |
|  | 1.2 | 130 | 3.5 | 120 |
| Magnetized fuel + magnetized steam | 2.0 | 160 | 1.0 | 20 |
|  | 1.2 | 135 | 2.5 | 60 |
|  | 1.0 | 125 | 3.0 | 80 |

EXAMPLE 3

Example 2 was repeated except that air was used instead of steam and subjected to magnetizing treatment.

Figure 6:
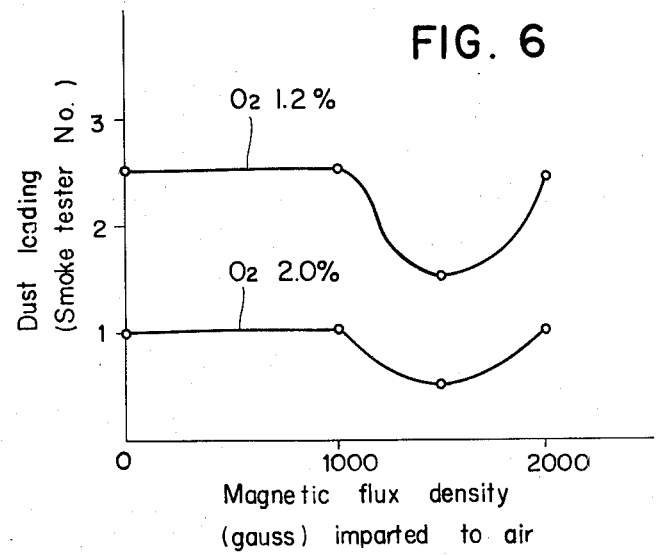
FIG. 6 is a diagram showing the relationship of dust loading to magnetic flux density imparted to air in Example 3.

The results obtained by varying the flux density from 0 to 2000 gauss in the air feeding pipe are shown in FIG. 6. As seen from the relationship of dust content to flux density shown in FIG. 6, the dust content is lowest at 1500 gauss.

At a flux density of 1500 gauss in air, the dust and nitrogen oxide (NO$_x$) contents in exhaust gas were determined. The results are tabulated in Table II.

Table II

|  | O$_2$ (vol %) | NO$_x$ (ppm) | Dust loading | |
|---|---|---|---|---|
|  |  |  | Smoke tester (NO.) | JIS Z 8808 (mg/Nm$^3$) |
| Magnetized fuel | 2.0 | 160 | 1.0 | 20 |
|  | 1.2 | 135 | 2.5 | 60 |
| Magnetized fuel + magnetized air | 2.0 | 165 | 0.5 | 10 |
|  | 1.2 | 140 | 1.5 | 30 |
|  | 0.8 | 120 | 3.5 | 120 |

Figure 7:
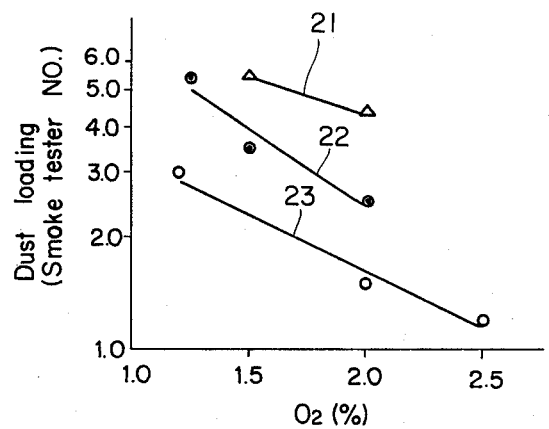
FIGS. 7 and 8 are diagrams showing the relationships of residual oxygen content to dust loading and nitrogen oxide content in Example 3.
Figure 8:
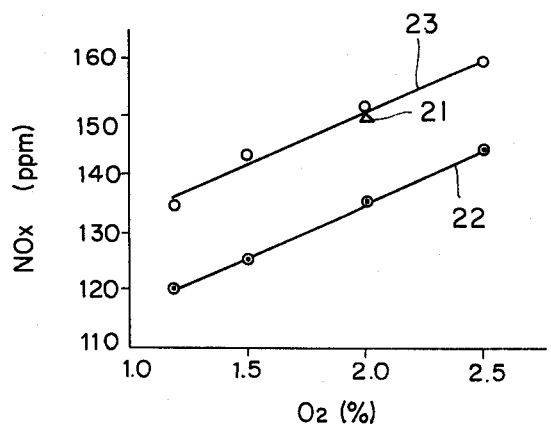

In order to show how the magnetizing treatment according to this invention can influence the relationships of residual oxygen to dust and NO$_x$ contents in exhaust gas, the data obtained are plotted in diagrams of FIGS. 7 and 8. In these diagrams, line 21 (appearing as triangle 21 in FIG. 8) is a reference test run conducted under usual conditions without magnetization. Line 22 corresponds to a test run where only fuel was subjected to magnetizing treatment and line 23 corresponds to a run where both fuel and air were subjected to magnetizing treatment as described above. It should be noted that a usual $NO_x$ reducing technique was used in the latter two test runs.

It was found that the boiler can be operated at a comparatively low oxygen content of 1.3 to 1.5% by volume in the flux density range of 1400 to 1800 gauss. A maximum reduction of dust loading according to this invention was 67% in comparison with the usual run.

EXAMPLE 4

A heat power boiler having a steam capacity of 135 tons/hour was used. "C$_5$" gasoline series fuel oil was used and the flux density was varied from 0 to 3000 gauss to magnetize the fuel. It was found that the preferred range was 1600 to 2300 gauss and the most preferred was 2150 gauss.

Figure 9:
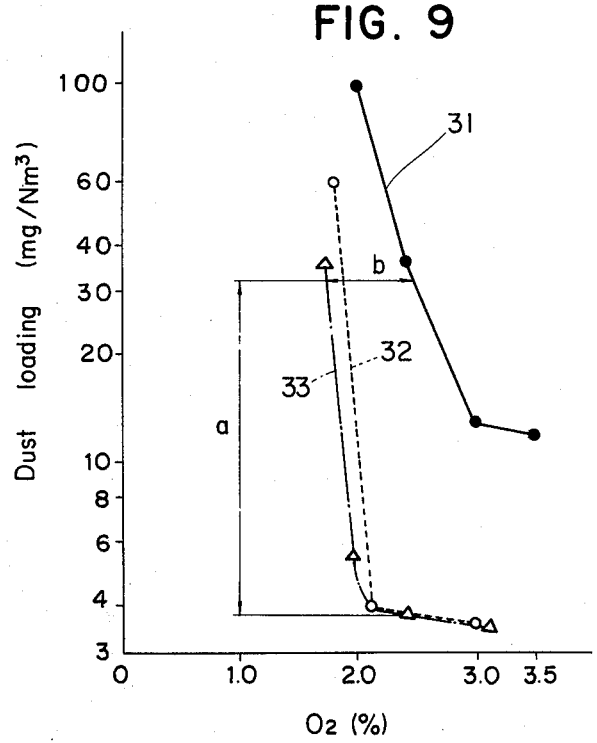
FIGS. 9 and 10 are diagrams showing the relationships of residual oxygen content to dust loading and nitrogen oxide content in Example 4.
Figure 10:
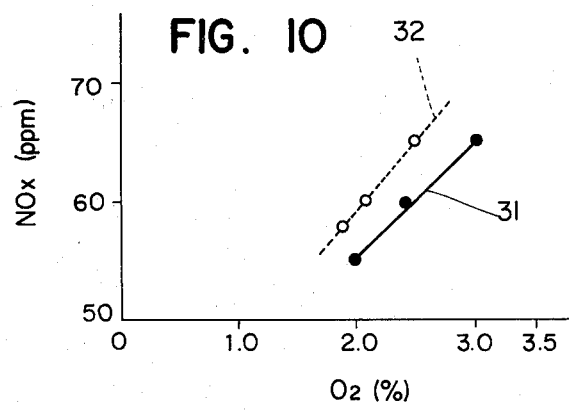

The results are shown in FIGS. 9 and 10. Line 31 is a reference test run conducted under usual conditions without magnetization. Line 22 corresponds to a test run where fuel is magnetized to 1600 gauss and line 33 corresponds to a test run where fuel is magnetized to 2150 gauss.

As apparent from FIG. 9, according to the magnetizing treatment of this invention, the dust loading can be reduced by 90% at the same oxygen content of 2.5% as shown by line a. The oxygen content can be reduced from 2.5% to 1.7% at the same dust loading of 34 mg/Nm$^3$ as shown by line b. As seen from FIG. 10, for example, the content of residual oxygen in exhaust gas can be reduced from 2.5 vol% of the reference run to 2.1 vol% at the same nitrogen oxide content of 60 ppm.

In another test run, air was subjected to magnetizing treatment. An additional substantially uniform effect was found over the range from 1000 to 2000 gauss.

After the magnetizing apparatus was removed, an effect due to residual magnetism was observed.

EXAMPLE 5

A 90 tons/hour heat power boiler was used. "C" fuel oil having a sulfur content of 2.7% was fed and subjected to magnetizing treatment to impart a flux density of 1800 gauss. Steam fed to the boiler was also subjected to magnetizing treatment to impart a flux density of 1200 gauss. When only fuel was magnetized, the oxygen content was reduced from 3.8% of usual run to 3.3%. When steam was further magnetized, the oxygen content was reduced to 2.3%.

What I claim is:

1. In combination with pipes for feeding fluid fuel and air-containing gas to combustion devices, a magnetizing apparatus comprising
    a casing having means for securing the casing on the pipe so that the pipe penetrates the casing substantially at the center thereof,
    a pair of connecting yokes fixedly disposed in the casing at opposite sides thereof,
    a plurality of permanent magnets placed in two parallel rows between said connecting yokes said magnets being oriented such that the poles of all of the magnets in each row are aligned along a single axis and the axes of the two rows are parallel to one another,
    a pair of movable yokes sandwiched between said magnets in each row, said movable yokes facing the pipe and being movable in a direction perpendicular to the direction of the rows of said permanent magnets and
    adjusting means for moving said movable yokes towards and away from the pipe in the direction perpendicular to the direction of the rows of said permanent magnets,
    wherein said magnets and yokes produce a variable flux density of at least 10 gauss traversing the pipe.

2. A magnetizing apparatus as set forth in claim 1 wherein the arrangements of said connecting yoke, magnets and movable yoke on opposite sides of said pipe are substantially symmetrical with respect to the pipe.

3. A magnetizing apparatus as set forth in claim 1 wherein said adjusting means is a screw and knob threaded into the casing and the movable yoke.

* * * * *